US012414492B2

(12) United States Patent
Redden et al.

(10) Patent No.: US 12,414,492 B2
(45) Date of Patent: Sep. 16, 2025

(54) SYSTEM AND METHOD FOR AUTOMATED ODOMETRY CALIBRATION FOR PRECISION AGRICULTURE SYSTEMS

(71) Applicant: Deere & Company, Moline, IL (US)

(72) Inventors: Lee Kamp Redden, Palo Alto, CA (US); Kent Anderson, Signal Mountain, TN (US); Edward William Jeffcott Pell, Sunnyvale, CA (US); James Patrick Ostrowski, Mountain View, CA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/747,389

(22) Filed: Jun. 18, 2024

(65) Prior Publication Data

US 2024/0334862 A1 Oct. 10, 2024

Related U.S. Application Data

(63) Continuation of application No. 17/544,941, filed on Dec. 8, 2021, now Pat. No. 12,041,867, which is a
(Continued)

(51) Int. Cl.
*A01B 79/00* (2006.01)
*A01B 41/06* (2006.01)
(Continued)

(52) U.S. Cl.
CPC ............ *A01B 79/005* (2013.01); *A01B 41/06* (2013.01); *A01C 21/00* (2013.01); *A01C 21/005* (2013.01);
(Continued)

(58) Field of Classification Search
CPC ....... A01B 79/005; A01B 41/06; A01B 79/00; A01B 41/00; Y02A 40/10; Y02A 40/00;
(Continued)

(56) References Cited

U.S. PATENT DOCUMENTS 3,892,357 A 7/1975 Tamny
4,015,366 A 4/1977 Hall
(Continued)

FOREIGN PATENT DOCUMENTS

CA 2439575 C 2/2008
CN 102166548 B 10/2012
(Continued)

OTHER PUBLICATIONS

Extended European Search Report for European Patent Application No. EP 15752192.3, dated Oct. 4, 2017, 10 Pages.
(Continued)

*Primary Examiner* — Christopher J. Novosad
(74) *Attorney, Agent, or Firm* — Fenwick & West LLP

(57) ABSTRACT

A method including: recording a first image of a first field region; automatically treating a plant within the first region in-situ based on the first image; automatically verifying the plant treatment with a second image of the first region; and automatically treating a second region concurrently with treatment verification.

20 Claims, 9 Drawing Sheets

Related U.S. Application Data continuation of application No. 16/153,824, filed on Oct. 8, 2018, now Pat. No. 11,197,409, which is a continuation of application No. 15/632,583, filed on Jun. 26, 2017, now Pat. No. 10,098,273, which is a continuation of application No. 14/629,361, filed on Feb. 23, 2015, now Pat. No. 9,717,171.

(60) Provisional application No. 61/943,158, filed on Feb. 21, 2014.

(51) Int. Cl.
| | | |
|---|---|---|
| *A01C 21/00* | (2006.01) | |
| *A01M 21/00* | (2006.01) | |
| *A01M 21/02* | (2006.01) | |
| *A01M 21/04* | (2006.01) | |
| *G01C 7/04* | (2006.01) | |
| *G01C 11/00* | (2006.01) | |
| *G01C 11/06* | (2006.01) | |
| *G01C 15/04* | (2006.01) | |

(52) U.S. Cl.
CPC ............ *A01M 21/00* (2013.01); *A01M 21/02* (2013.01); *A01M 21/04* (2013.01); *G01C 7/04* (2013.01); *G01C 11/00* (2013.01); *G01C 11/06* (2013.01); *G01C 15/04* (2013.01); *Y02A 40/10* (2018.01)

(58) Field of Classification Search
CPC ...... A01C 21/00; A01C 21/005; A01M 21/00; A01M 21/02; A01M 21/04; G01C 7/04; G01C 11/00; G01C 11/06; G01C 15/04; G01C 7/02; G01C 7/00; G01C 15/02; G01C 15/00
See application file for complete search history.

(56) References Cited

U.S. PATENT DOCUMENTS

| | | | |
|---|---|---|---|
| 5,222,324 | A | 6/1993 | O'Neall et al. |
| 5,296,702 | A | 3/1994 | Beck et al. |
| 5,442,552 | A | 8/1995 | Slaughter et al. |
| 5,453,618 | A | 9/1995 | Sutton et al. |
| 5,507,115 | A | 4/1996 | Nelson |
| 5,585,626 | A | 12/1996 | Beck et al. |
| 5,606,821 | A | 3/1997 | Sadjadi et al. |
| 5,621,460 | A | 4/1997 | Hatlestad et al. |
| 5,661,817 | A | 8/1997 | Hatlestad et al. |
| 5,708,828 | A | 1/1998 | Coleman |
| 5,768,823 | A | 6/1998 | Nelson |
| 5,789,741 | A | 8/1998 | Kinter et al. |
| 5,793,035 | A | 8/1998 | Beck et al. |
| 5,809,440 | A | 9/1998 | Beck et al. |
| 5,837,997 | A | 11/1998 | Beck et al. |
| 5,911,668 | A | 6/1999 | Auerbach et al. |
| 5,924,239 | A | 7/1999 | Rees et al. |
| 5,927,603 | A | 7/1999 | McNabb |
| 6,160,902 | A | 12/2000 | Dickson et al. |
| 6,199,000 | B1 | 3/2001 | Keller et al. |
| 6,212,824 | B1 | 4/2001 | Orr et al. |
| 6,336,051 | B1 | 1/2002 | Pangels et al. |
| 6,553,299 | B1 | 4/2003 | Keller et al. |
| 6,574,363 | B1 | 6/2003 | Classen et al. |
| 6,671,582 | B1 | 12/2003 | Hanley |
| 6,919,959 | B2 | 7/2005 | Masten |
| 6,999,877 | B1 | 2/2006 | Dyer et al. |
| 7,032,369 | B1 | 4/2006 | Eaton et al. |
| 7,212,670 | B1 | 5/2007 | Rousselle et al. |
| 7,248,968 | B2 | 7/2007 | Reid |
| 7,313,268 | B2 | 12/2007 | Luo et al. |
| 7,408,145 | B2 | 8/2008 | Holland |
| 7,412,330 | B2 | 8/2008 | Spicer et al. |
| 7,570,783 | B2 | 8/2009 | Wei et al. |
| 7,580,549 | B2 | 8/2009 | Wei et al. |
| 7,684,916 | B2 | 3/2010 | Wei et al. |
| 7,715,013 | B2 | 5/2010 | Glaser et al. |
| 7,716,905 | B2 | 5/2010 | Wilcox et al. |
| 7,721,515 | B2 | 5/2010 | Pollklas et al. |
| 7,723,660 | B2 | 5/2010 | Holland |
| 7,792,622 | B2 | 9/2010 | Wei et al. |
| 7,876,927 | B2 | 1/2011 | Han et al. |
| 7,877,969 | B2 | 2/2011 | Behnke |
| 7,894,663 | B2 | 2/2011 | Berg et al. |
| 7,904,218 | B2 | 3/2011 | Jochem et al. |
| 7,911,517 | B1 | 3/2011 | Hunt et al. |
| 8,027,770 | B2 | 9/2011 | Poulsen |
| 8,028,470 | B2 | 10/2011 | Anderson |
| 8,265,835 | B2 | 9/2012 | Peterson et al. |
| 8,537,360 | B2 | 9/2013 | Stachon et al. |
| 9,717,171 | B2 | 8/2017 | Redden et al. |
| 10,098,273 | B2 | 10/2018 | Redden et al. |
| 11,197,409 | B2 | 12/2021 | Redden et al. |
| 12,041,867 | B2 * | 7/2024 | Redden ............ G01C 15/04 |
| 2003/0009282 | A1 | 1/2003 | Upadhyaya et al. |
| 2003/0019949 | A1 | 1/2003 | Solie et al. |
| 2007/0044445 | A1 | 3/2007 | Spicer et al. |
| 2008/0141585 | A1 | 6/2008 | Benfey et al. |
| 2009/0210119 | A1 | 8/2009 | Poulsen |
| 2010/0074515 | A1 | 3/2010 | Zhao et al. |
| 2010/0215222 | A1 | 8/2010 | Zeelen et al. |
| 2010/0322477 | A1 | 12/2010 | Schmitt et al. |
| 2011/0167721 | A1 | 7/2011 | Lejeune et al. |
| 2011/0211733 | A1 | 9/2011 | Schwarz |
| 2012/0101784 | A1 | 4/2012 | Lindores et al. |
| 2012/0169504 | A1 | 7/2012 | Hillger et al. |
| 2012/0189762 | A1 * | 7/2012 | Reineccius ....... G06Q 10/0631 118/696 |
| 2012/0215410 | A1 | 8/2012 | McClure et al. |
| 2012/0237083 | A1 | 9/2012 | Lange et al. |
| 2013/0235199 | A1 | 9/2013 | Nixon |
| 2013/0238201 | A1 | 9/2013 | Redden |
| 2013/0291138 | A1 | 10/2013 | Feng et al. |
| 2014/0107957 | A1 | 4/2014 | Lindores et al. |
| 2014/0180549 | A1 | 6/2014 | Siemens et al. |
| 2015/0027040 | A1 | 1/2015 | Redden |

FOREIGN PATENT DOCUMENTS

| | | |
|---|---|---|
| DE | 19523648 A1 | 1/1997 |
| JP | 3831249 B2 | 10/2006 |
| WO | WO 97/17830 A1 | 5/1997 |
| WO | WO 00/03589 A1 | 1/2000 |
| WO | WO 2006/117581 A1 | 11/2006 |
| WO | WO 2011/119403 A1 | 9/2011 |
| WO | WO 2012/094116 A1 | 7/2012 |

OTHER PUBLICATIONS

PCT International Search Report and Written Opinion for PCT/US2015/017159, dated Jun. 2, 2015, 18 Pages.
United States Office Action, U.S. Appl. No. 16/153,824, filed Apr. 7, 2021, 10 pages.
United States Office Action, U.S. Appl. No. 14/629,361, filed Nov. 4, 2016, 16 Pages.
United States Office Action, U.S. Appl. No. 15/662,583, filed Dec. 14, 2017, 8 pages.
United States Office Action, U.S. Appl. No. 17/544,941, filed Nov. 28, 2023, 37 pages.

* cited by examiner

SYSTEM AND METHOD FOR AUTOMATED ODOMETRY CALIBRATION FOR PRECISION AGRICULTURE SYSTEMS

CROSS-REFERENCE TO RELATED APPLICATIONS

This application is a continuation of U.S. patent application Ser. No. 17/544,941, filed on Dec. 8, 2021, now U.S. Pat. No. 12,041,867, which is a continuation of U.S. patent application Ser. No. 16/153,824, filed on Oct. 8, 2018, now U.S. Pat. No. 11,197,409, which is a continuation of U.S. patent application Ser. No. 15/632,583, filed on Jun. 26, 2017, now U.S. Pat. No. 10,098,273), which is a continuation of U.S. patent application Ser. No. 14/629,361, filed Feb. 23, 2015, now U.S. Pat. No. 9,717,171, which claims the benefit of U.S. Provisional Application No. 61/943,158, filed Feb. 21, 2014, each of which is incorporated in its entirety by this reference. This application is related to U.S. patent application Ser. No. 13/788,320 filed Mar. 7, 2013, now U.S. Pat. No. 9,030,549, U.S. patent application Ser. No. 14/329,161, filed Jul. 11, 2014, now U.S. Pat. No. 9,658,201, and U.S. patent application Ser. No. 14/444,897, filed Jul. 28, 2014, now U.S. Pat. No. 10,537,071, all of which are incorporated by reference in their entirety for all purposes.

TECHNICAL FIELD

This invention relates generally to the agricultural odometry field, and more specifically to a new and useful real-time automatic calibration in the agricultural odometry field.

BACKGROUND

Automatic, real-time plant selection for crop thinning requires precise distance measurements to ensure complete plant necrosis or retention by accommodating for the physical offset between the detection mechanism and the action mechanism. However, conventional odometry mechanisms are unsuited for this application. Remote systems, such as GPS, have resolutions that are too low to determine the precise beginning and end of a plant within a field. Furthermore, these remote systems tend to be slow and power consuming, rendering the systems impractical for real-time plant selection. Visual odometry mechanisms are too slow for use in real-time, in-situ plant treatment. On-board systems, particularly mechanical systems, could be ideal due to short computing times and low power requirements. However, these systems suffer from environmental interference. For example, a wheel encoder that measures the traversed distance based on the radius and number of rotations of a wheel rolling along the ground could be used. However, the wheel encoder suffers from interference from the surface features of the ground, which varies across a field. As shown in FIG. 4, in soft ground (e.g., soft or loose soil), the wheel of the wheel encoder slips, resulting in slower wheel rotation than would be expected for the same linear axle translation. In rough terrain (e.g., dry ground or lumpy soil), the wheel of the wheel encoder traverses over a larger distance (e.g., surface area) than expected for the same linear axle translation. This inaccuracy, while small, can be too large for precision in-situ agricultural use, such as when close-packed plants are to be treated.

Thus, there is a need in the agricultural odometry field to create a new and useful automatic odometry calibration system and method. This invention provides such new and useful automatic odometry calibration system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 2:
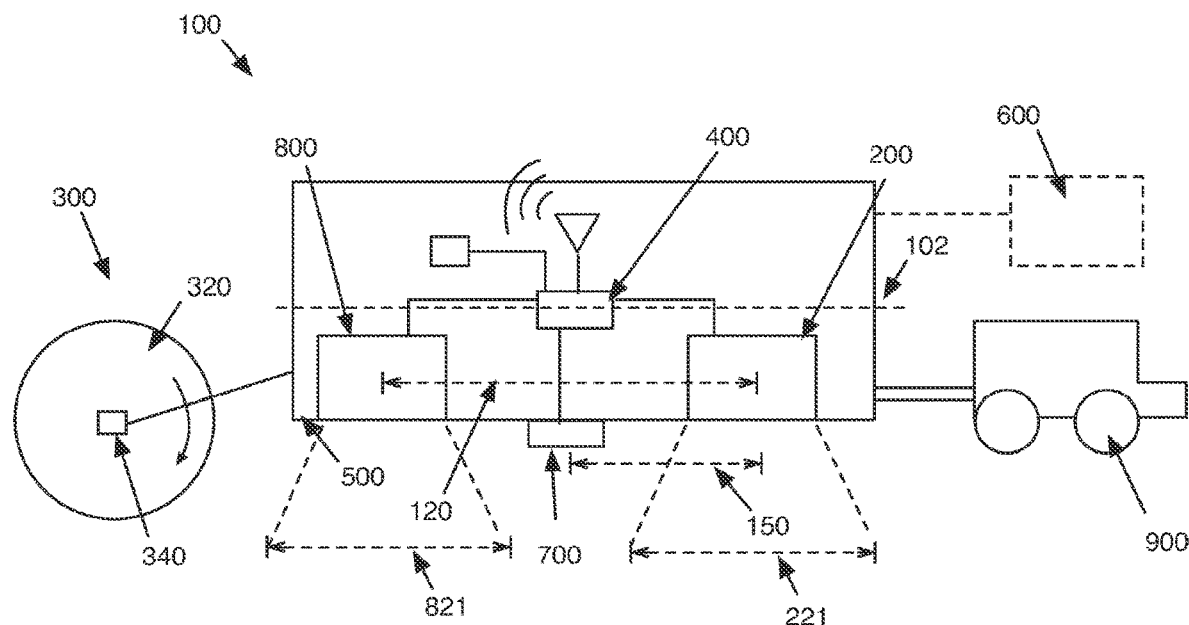
FIG. 2 is a schematic representation of an example of the precision agriculture system.

As shown in FIG. 2, the precision agriculture system 100 includes a detection sensor 200, odometry mechanism 300, processing system 400, and frame 500. The system can define a travel axis 102, and is preferably couplable or include a power source 600. The system can additionally include a treatment mechanism 700 and/or a verification sensor 800. The system can be substantially similar to that disclosed in U.S. application Ser. No. 13/788,320 filed 7 Mar. 2013, incorporated herein in its entirety by this reference, but can alternatively be any other suitable system. The precision agriculture system 100 functions to perform the method, and can additionally or alternatively perform any other suitable functionality. In one variation, the system functions to determine treatments for and/or apply treatments to plants 12 in-situ (e.g., within the field 20) on a plant-by-plant basis.

The detection sensor 200 (first sensor) of the system functions to record a first image 222. The first image 222 can be used for plant 12 identification, treatment determination, odometry calibration, treatment calibration, system monitoring, treatment validation, or be used in any other suitable manner. The detection sensor 200 can be a camera (e.g., CCD camera, multispectral camera, stereoscopic camera, omnidirectional camera, etc.), ultrasound receiver, or any other suitable sensor. The detection sensor 200 can be coupled with one or more emitters configured to emit an electromagnetic wave (e.g., visible light, UV light, etc.), sound, or any other suitable signal. The detection sensor 200 is preferably operated to record measurements of the target 10 (e.g., field region within the field of view, plant 12, etc.) at a predetermined frequency (e.g., 5 images/second, 5 images/2 seconds, etc.), but can alternatively be recorded in response to the occurrence of a recordation event (e.g., in response to a time threshold being met, in response to a preceding tactile sensor detecting a plant 12, etc.), or be operated at any other suitable frequency.

The detection sensor 200 is preferably statically mounted to the frame 500 (e.g., bolted, screwed, or otherwise mounted to the frame 500), but can alternatively be movably, rotatably, or otherwise coupled to the frame 500. The intrinsic parameters of the detection camera 220 preferably remain substantially constant throughout system operation (e.g., within a threshold variance threshold), but can alternatively dynamically vary throughout system operation. For example, the detection sensor field of view (FOV) 221 preferably remains constant throughout system operation, but can alternatively be automatically or manually adjusted (e.g., to accommodate for changes in camera height 140 or distance from the imaging target 10 or ground). The number of pixels within the FOV is preferably predetermined and known, but can alternatively be unknown, dynamically determined, or determined in any other suitable manner. In another example, the detection sensor focus length preferably remains constant throughout system operation, but can alternatively be automatically or manually adjusted during system operation. In another example, the image center in the image plane preferably remains static relative to a reference point on the frame 500 or statically coupled component thereto, but can alternatively be mobile or be otherwise related to the system.

Figure 9:
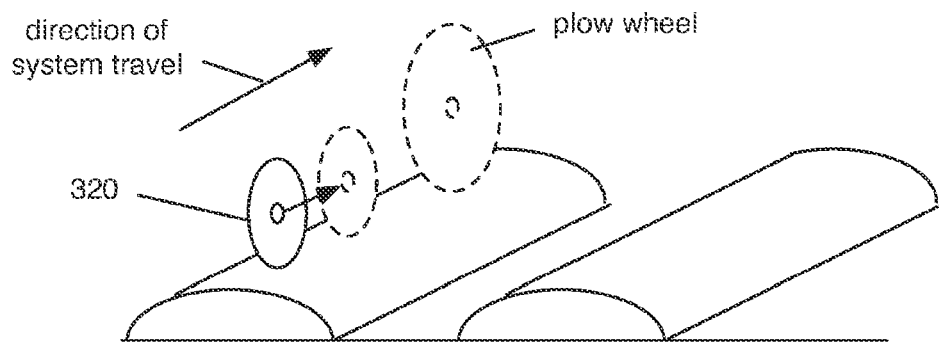
FIGS. 9, 10, and 11 are schematic representations of a first, second, and third variant of odometry mechanism placement in a plant field.
Figure 10:
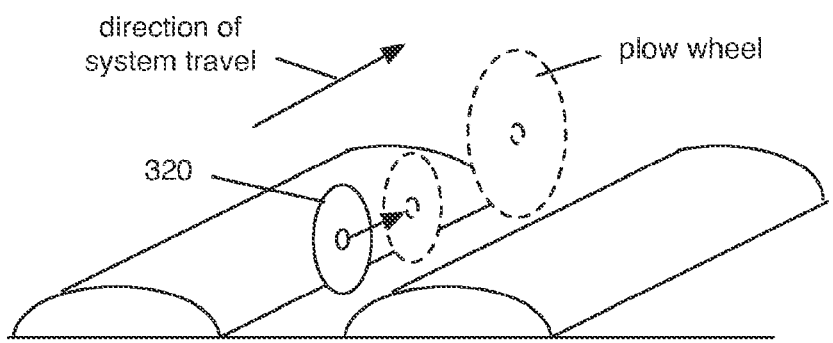
Figure 11:
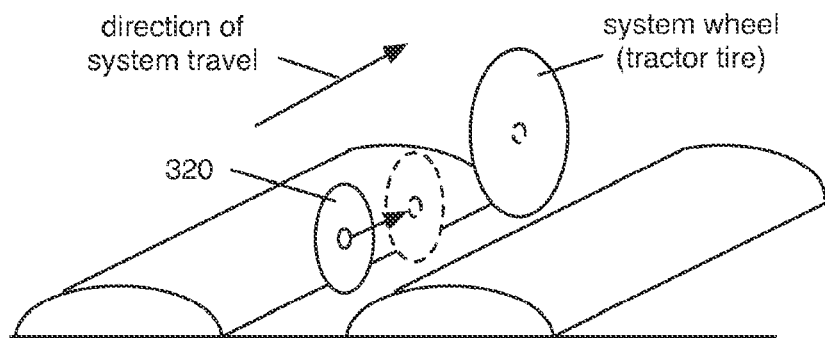

The odometry mechanism 300 (odometry system) functions to estimate the distance travelled by the agriculture system 100. The odometry mechanism 300 can alternatively determine the distance travelled by the agriculture system 100 (e.g., wherein the travelled distance determined by the odometry mechanism 300 is within a threshold error of the actual distance 802 travelled). The odometry mechanism 300 is preferably a mechanical odometry mechanism 300, but can alternatively be a visual odometry mechanism 300 or be any other suitable system. The mechanical odometry mechanism 300 can be a wheel 320 with a rotary encoder 340 configured to record full or partial rotations of the wheel 320. The wheel 320 preferably has a substantially constant diameter, but can alternatively have a variable diameter. The wheel 320 is preferably substantially light (e.g., 3 pounds or less), but can alternatively be heavier. The wheel 320 is preferably movably coupled to the frame 500 (e.g., coupled along the rotational axis with a 4-bar linkage or any other suitable linkage that enables vertical and/or lateral translation), but can alternatively be statically coupled or otherwise coupled to the frame 500. The wheel 320 can be configured to trail behind the detection sensor 200 or agriculture system 100 component, lead before the detection sensor 200 or agriculture system 100 component, run alongside the detection sensor 200 or agriculture system 100 component, or be arranged in any other suitable relative location. As shown in FIGS. 9, 10, and 11, the wheel 320 can be configured to roll within a furrow, along a crop bed, within a wheel track, behind a plow wheel, or arranged in any other suitable location. However, any other suitable odometry mechanism 300 can be used.

The odometry mechanism 300 is preferably operated to record odometry measurements (e.g., wheel revolutions, field scans, etc.) at a predetermined frequency (e.g., 5 measurements/second, 5 measurements/2 seconds, 10 measurements/second, etc.), but can alternatively be recorded in response to the occurrence of a recordation event (e.g., in response to a time threshold being met, in response to a preceding tactile sensor detecting a plant 12, etc.), or be operated at any other suitable frequency. The odometry mechanism 300 can estimate the distance travelled 302 since a reference time, wherein the reference time can be the first time the system was operated (e.g., wherein the odometry mechanism 300 estimates the total distance travelled over the lifetime of the agriculture system 100 thus far), the last power-on event (e.g., wherein the odometry mechanism 300 estimates the distance travelled over the course of substantially continuous system operation), the last first image 222 capture event (e.g., wherein the odometry mechanism 300 estimates the distance travelled by the system from the first region 224), a reference timestamp associated or unassociated with a calibration event, or any other suitable reference time. Alternatively, the odometry mechanism 300 can estimate the distance from a reference location (e.g., a first region 224 associated with the first image 222, starting point, etc.), as determined by a GPS system, triangulation (e.g., cell tower or marker triangulation), or any other suitable location determination system. The odometry mechanism 300 measurements can each be associated with a timestamp (e.g., a global timestamp, a relative timestamp, etc.), a time period, and/or any other suitable timescale. The odometry mechanism 300 measurements can be stored onboard the agriculture system 100, stored remotely, or stored in any other suitable location. The odometry mechanism 300 measurements can be associated with images (e.g., based on the respective timestamps), unassociated with images, or associated with any other suitable piece of information. However, the odometry mechanism 300 can be operated, and measurements used, in any other suitable manner.

The processing system 400 of the system functions to perform the method. Alternatively, some or all of the method can be performed by a remote system. Local calibration and/or verification can be preferred in some embodiments to mitigate lag due to remote system processing and data transfer. However, the method can be performed by any suitable component. In one variation, the processing system 400 functions to select images for use in the method from a plurality of images, identify treatment targets 10, determine treatments for the treatment targets 10, treat the targets 10, calibrate the odometry mechanism 300, calibrate the treatment mechanism 700, and monitor the system in near-real time. The processing system 400 can additionally function to discard measurements (e.g., images, odometry measurements, etc.) that will not be used. The processing system 400 can additionally function to learn based on the recorded images. For example, the processing system 400 can learn and/or better refine treatment indicator 704 identification methods based on the recorded images. The processing system 400 can include one or more computing units, one or more storage units, or any other suitable system component.

The frame 500 of the system functions to support the system components. The frame 500 can additionally function to couple the system to a drive, such as a tractor mechanism (e.g., the hitch of a tractor). The frame 500 can statically or movably mount the sensor(s) (e.g., detection sensor 200, verification sensor 800), the odometry mechanism 300, the treatment mechanisms 700, or any other suitable portion of the system. The frame 500 is preferably substantially rigid, but can alternatively be jointed, flexible, or have any other suitable construction.

The system preferably defines a travel axis 102 that extends along the direction of system travel. The travel axis 102 can be substantially parallel with the system longitudinal axis, substantially parallel with the travel path, and/or substantially parallel with the longitudinal axis or drive axis of the drive mechanism 900.

The system can additionally include a power source 600 configured to power the sensor(s), emitter(s), processing system 400, odometry mechanism 300, treatment mechanism 700, and/or any other suitable system component. The power source 600 can be a power storage system (e.g., a secondary battery), a generator, a renewable energy system (e.g., a solar panel system), or any other suitable power source 600. The power source 600 can be arranged on the system (e.g., supported by the frame 500), arranged distal the system (e.g., on the drive mechanism 900), or arranged in any other suitable location.

The system can additionally include a treatment mechanism 700 that functions to apply a treatment to the field, more preferably the plants 12, in-situ. The treatment mechanism 700 is preferably arranged behind the detection sensor 200 along the travel axis 102 (e.g., distal a frame 500 connection point to the drive mechanism 900), but can alternatively be arranged in any other suitable location. The treatment mechanism 700 can be separated from the detection sensor 200, verification sensor 800, and/or any other suitable component by a sensor-to-treatment mechanism distance 150. However, the treatment mechanism 700 can be otherwise arranged. The treatment mechanism 700 can be aligned with the travel axis 102, offset from the travel axis 102, or arranged in any suitable location. The system can include one or more treatment mechanisms 700. In one variation, multiple treatment mechanisms 700 are arranged in a line, with a common axis perpendicular the travel axis 102. In a second variation, the multiple treatment mechanisms 700 are arranged in an array. However, the multiple treatment mechanisms 700 can be arranged in any suitable shape or configuration. The treatment mechanisms 700 can be nozzles, such as spray nozzles (e.g., fan, cone, jet, etc.), foam sprayers, misters, heat application systems, or any other suitable treatment mechanisms 700. The treatment (e.g., treatment material, treatment application) can include water, growth promoter (e.g., fertilizer), growth inhibitor (e.g., fertilizer at high concentrations, alcohol, weed killer, etc.), foam, heat, or any other suitable treatment. The treatment mechanisms 700 can be lower than the camera (e.g., closer to the ground), higher than the camera (e.g., further from the ground), or substantially level with the camera (e.g., wherein the camera and treatment mechanism 700 ends proximal the ground are substantially level when on flat ground). The treatment mechanism 700 can be statically mounted to the frame 500, movably mounted to the frame 500 (e.g., capable of moving laterally, longitudinally along the travel axis 102, vertically, or angularly), but can be otherwise mounted to the frame 500. However, the system can include any other suitable treatment mechanism 700.

The system can additionally include a verification sensor 800 (second sensor) that functions to record a second measurement 822 (e.g., second image) of the measurement pair for odometry calibration, treatment calibration, treatment verification, and/or treatment monitoring. The second measurement is preferably of a second region 824, wherein the second region 824 can be substantially equal to the first region 224 (e.g., overlap beyond a threshold percentage) or be separate and distinct from the first region 224. The verification sensor 800 can be a camera (e.g., CCD camera, multispectral camera, stereoscopic camera, omnidirectional camera, etc.), ultrasound receiver, or any other suitable sensor. The verification sensor 800 can be coupled with one or more emitters configured to emit an electromagnetic wave (e.g., visible light, UV light, etc.), sound, or any other suitable signal. The emitter can be the same emitter as that used for the detection sensor 200, or be a separate emitter. The verification sensor 800 is preferably operated to record measurements of the target 10 (e.g., field region within the field of view, plant 12, etc.) at a predetermined frequency (e.g., 5 images/second, 5 images/2 seconds, etc.), but can alternatively be recorded in response to the occurrence of a recordation event (e.g., in response to a time threshold being met, in response to a preceding tactile sensor detecting a plant 12, etc.), or be operated at any other suitable frequency.

The verification sensor 800 is preferably statically mounted to the frame 500 (e.g., bolted, screwed, or otherwise mounted to the frame 500), but can alternatively be movably, rotatably, or otherwise coupled to the frame 500. The verification sensor 800 is preferably arranged behind the detection sensor 200, more preferably behind the treatment mechanism 700 but alternatively in any other suitable position, along the travel axis 102. However, the verification sensor 800 can be otherwise arranged. In some variations, the detection sensor 200 to verification sensor 800 distance (sensor or camera separation distance 120) is fixed and known because both sensors are statically mounted to fixed, predetermined mounting points in the frame 500. This sensor separation distance can be automatically determined (e.g., pre-stored based on the known mounting points), manually determined and stored within the system, or otherwise determined. However, the sensor or camera separation distance 120 can be variable or otherwise configured.

The intrinsic parameters of the verification camera 820 preferably remain substantially constant throughout system operation (e.g., within a threshold variance threshold), but can alternatively dynamically vary throughout system operation. For example, the verification sensor field of view (FOV) 821 preferably remains constant throughout system operation, but can alternatively be automatically or manually adjusted (e.g., to accommodate for changes in camera height or distance from the imaging target 10 or ground). The verification camera field of view preferably does not overlap with that of the detection sensor 200, but can alternatively overlap. The number of pixels within the FOV is preferably predetermined and known, but can alternatively be unknown, dynamically determined, or determined in any other suitable manner. In another example, the verification sensor focus length preferably remains constant throughout system operation, but can alternatively be automatically or manually adjusted during system operation. In another example, the image center in the image plane preferably remains static relative to a reference point on the frame 500 or statically coupled component thereto, but can alternatively be mobile or be otherwise related to the system.

In some variations, the verification sensor 800 is controlled to record an image of substantially the same geographic region as that of the first image 222 (first region 224), as determined based on the distance estimated by the odometry mechanism 300. Alternatively or additionally, the verification sensor 800 is controlled to substantially continuously record images, wherein the image substantially corresponding to the first region 224 is selected from the plurality of images (e.g., based on a timestamp correlating the estimated distance from a number of encoder 340 ticks to the image). However, a second image 822 of substantially the first region 224 can be otherwise obtained.

2. Method.

Figure 1:
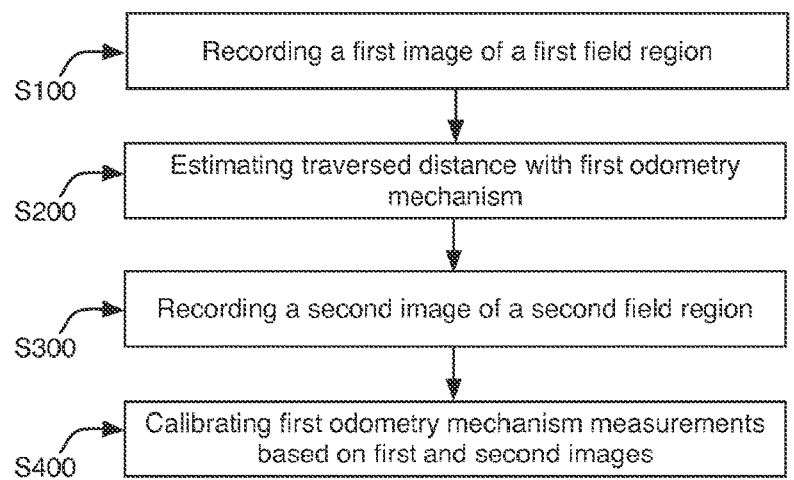
FIG. 1 is a schematic representation of the odometry calibration method.

As shown in FIG. 1, the method for operating a precision agriculture system includes recording a first image of a first field region S100, estimating a traversal distance for the system with an odometry mechanism S200, recording a second image of a second field region S300, and calibrating the odometry mechanism measurements based on the first and second images S400. The method functions to leverage visual odometry to correct odometry measurements, more preferably mechanical odometry measurements but alternatively measurements from any other suitable odometry mechanism. The method can additionally or alternatively function to increase the precision of treatment application to plants in-situ (e.g., within a plant field). The method can additionally or alternatively function to monitor system performance and identify system failures. The method is preferably performed with the agriculture system 100 disclosed above, but can alternatively be performed by any other suitable system. The method can be performed at a predetermined frequency (e.g., substantially continuously), in response to the occurrence of a calibration event, or at any other suitable frequency.

The method can be used in vegetable precision agriculture (e.g., weeding, crop thinning, etc.), wherein the method can additionally include treating the plants in-situ based on the odometry calibration and/or calibrating the treatment mechanism. The method can additionally or alternatively be used to map crop fields, wherein the odometry calibration can enable more precise geographical location assignment to plant measurements (e.g., images, multispectral measurements, etc.). However, the method can be otherwise used.

A. Potential Benefits.

This method can confer several benefits over conventional agriculture systems. First, the method can enable high precision treatment application to individual plants (e.g., within error margins of ¼ inches to ½ inches) using a terrestrial system (e.g., ground-based system). This can be particularly useful in systems with rotary encoders as the odometry mechanism. Rotary encoders can suffer from small encoder distance variations due to wheel slip and/or sliding along the ground, which can result in treatment errors 160 that are small, but not of negligible consequence. By periodically calibrating the odometry mechanism with visual odometry outputs, the method enables both near real-time, in-situ distance determination (using the inaccurate but fast rotary encoder system) and high precision distance determination (using the more precise but slower visual odometry mechanism). In doing so, the method provides near real-time odometry and/or treatment calibration for near real-time feedback to near real-time plant treatment in-situ.

Figure 15:
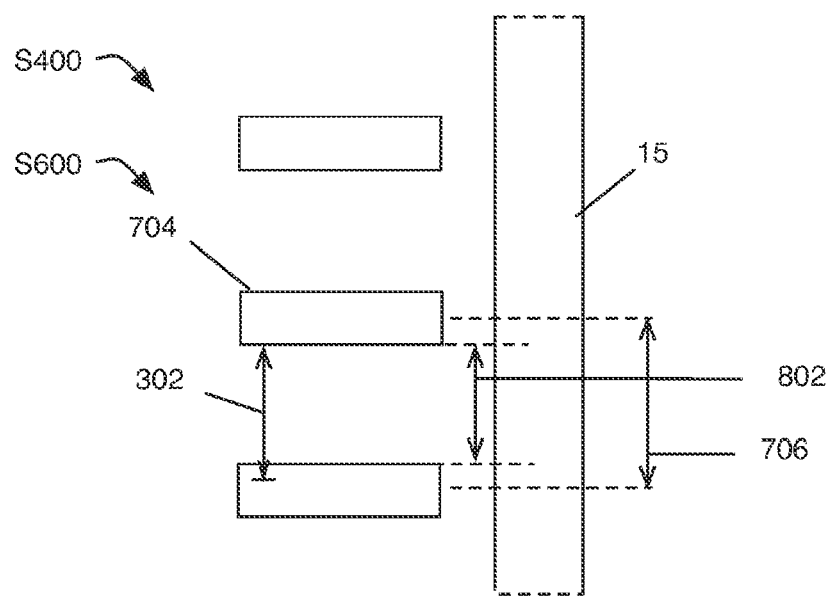
FIGS. 15, 16, and 17 are schematic representations of a first, second, and third variation of measuring a measured distance of action mechanism operation in the first mode with a calibration mechanism.
Figure 16:
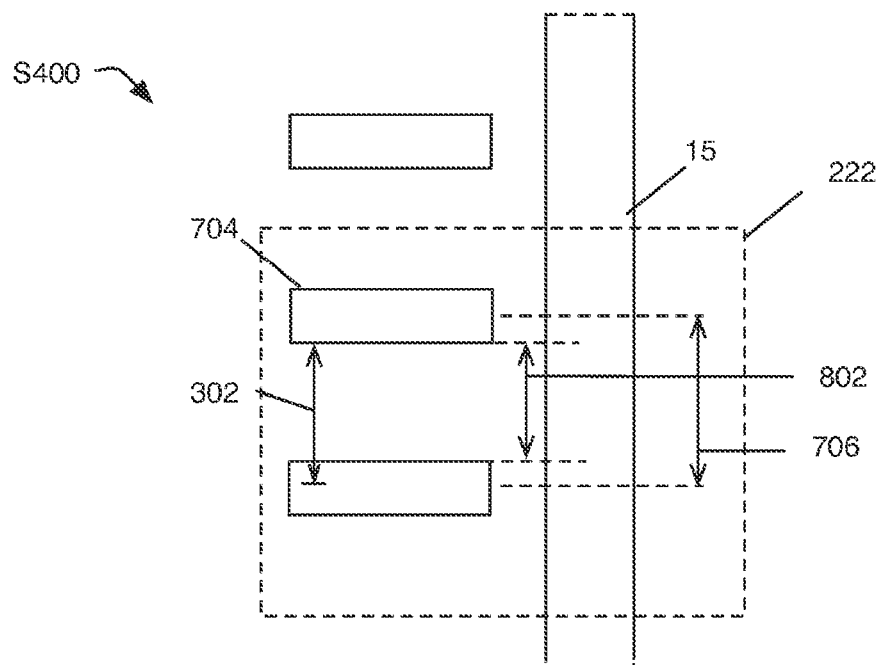

Second, the method can use unknown reference points as the points of comparison for the visual odometry mechanism. This enables the system to automatically calibrate the odometry mechanism and/or treatment mechanism during system operation (e.g., calibrate the system without user input, in a substantially uncontrolled environment, without a known reference point). The unknown reference points are preferably environmental features, such as field features (e.g., plants, rocks, shadows, treatment indicators, etc.), but can alternatively be any other suitable unknown reference point. Alternatively, the system can use known reference points as the points of comparison for the visual odometry mechanism, such as rulers 15 (e.g., retained a known distance away from the camera or the ground, etc.; examples of which are shown in FIGS. 15 and 16), user-placed field markers of known dimension, indicators having contrasting colors (e.g., orange) that are applied to the field (e.g., colored strips sprayed onto the field), triangulation markers (e.g., RF markers placed at known positions within or outside of the field), or use any other suitable known reference point.

Third, the method can confer the benefit of utilizing the same image set in multiple ways (e.g., wherein each image or image set has multiple functionalities). In particular, the method can use the same image, image pair, or image plurality to identify plants for treatment, calibrate the odometry mechanism, calibrate the treatment mechanism, and/or monitor the system for system failures. The image set can additionally or alternatively be used in any other suitable manner.

Fourth, some variants of the method can confer the benefit of concurrently accommodating for any variable that affects the treatment (e.g., spray) time of flight to the treatment target (e.g., plant). These variables can include treatment mechanism distance from the ground, treatment mechanism angle relative to the ground or gravity vector, pressure, treatment mechanism wear (e.g., solenoid sticking), or any other suitable variable. However, the variables can be accommodated and/or corrected for in any other suitable manner.

In some variations of the method, these benefits can be enabled by large amounts of on-board processing power capable of performing the method concurrently with system operation. These variations have the added benefit of mitigating communication delay that can occur with connected systems in which all or a portion of the method is performed remotely (e.g., at a remote computing system). Alternatively, the method can be entirely or partially performed remotely (e.g., at a remote computing system), wherein raw or processed image information, calibration parameters, or other information can be communicated via a transmitter and/or receiver.

B. Method Processes.

Recording a first measurement of a first field region S100 functions to record an image for use in odometry calibration. The measurement can additionally or alternatively be used for target identification, target prescription (e.g., treatment determination for the plant), treatment calibration, or for any other suitable use. The first measurement can be an image (e.g., single image, stereo image, omnidirectional image, multispectral image, etc.), a scan (e.g., a set of linear measurements), or any other suitable measurement. The first measurement is preferably recorded with the detection sensor, but can alternatively be recorded with the verification sensor or any other suitable sensor. The first measurement preferably records parameters of (e.g., an image of) a first geographic region within the field (first region, first field region), but can alternatively be associated with any other suitable geographic location or region. The first measurement is preferably associated with a timestamp (first time), wherein the timestamp can reflect the time (e.g., absolute or relative) at which the first measurement was recorded. Recording the first measurement can additionally include correcting the first measurement for known distortions or errors. For example, when the measurement is an image, recording the first image can include correcting the image for lens distortion using image processing techniques.

Estimating a traversal distance for the system with an odometry mechanism S200 functions to estimate the distance travelled by the system. The traversal distance is preferably estimated from a portion of the first region (e.g., from the geographic location corresponding to the center of the first image, from a geographic location corresponding to an edge of the first image, etc.), wherein the odometry count can be reset after each new first region is identified and recorded, but can alternatively be estimated from a remote reference point (e.g., the operation starting point) or from any other suitable point. The traversal distance can be corrected by the position correction factor or be uncorrected. The traversal distance is preferably estimated by the odometry mechanism, more preferably by a mechanical odometry mechanism, but alternatively be estimated in any other suitable manner (e.g., using GPS, etc.). In one example, the mechanical odometry mechanism includes a wheel and encoder pair, wherein the wheel rolls along the ground as the system traverses along the field, and the encoder measures the number of full and/or partial wheel rotations (e.g., with encoder ticks). However, the distance travelled can be otherwise determined or estimated.

Estimating the traversal distance S200 can additionally include storing the odometry measurements. The odometry measurements can be stored remotely or on-board. All odometry measurements can be stored. Alternatively, only the odometry measurements corresponding to selected measurements (e.g., measurements by the detection sensor, measurements by the verification sensor that are selected for use) can be stored. Alternatively, any suitable odometry measurements can be stored. The odometry measurement can be stored in association with a timestamp, a geographic location, one or more measurements (e.g., images), or in association with any other suitable piece of data.

Figure 5:
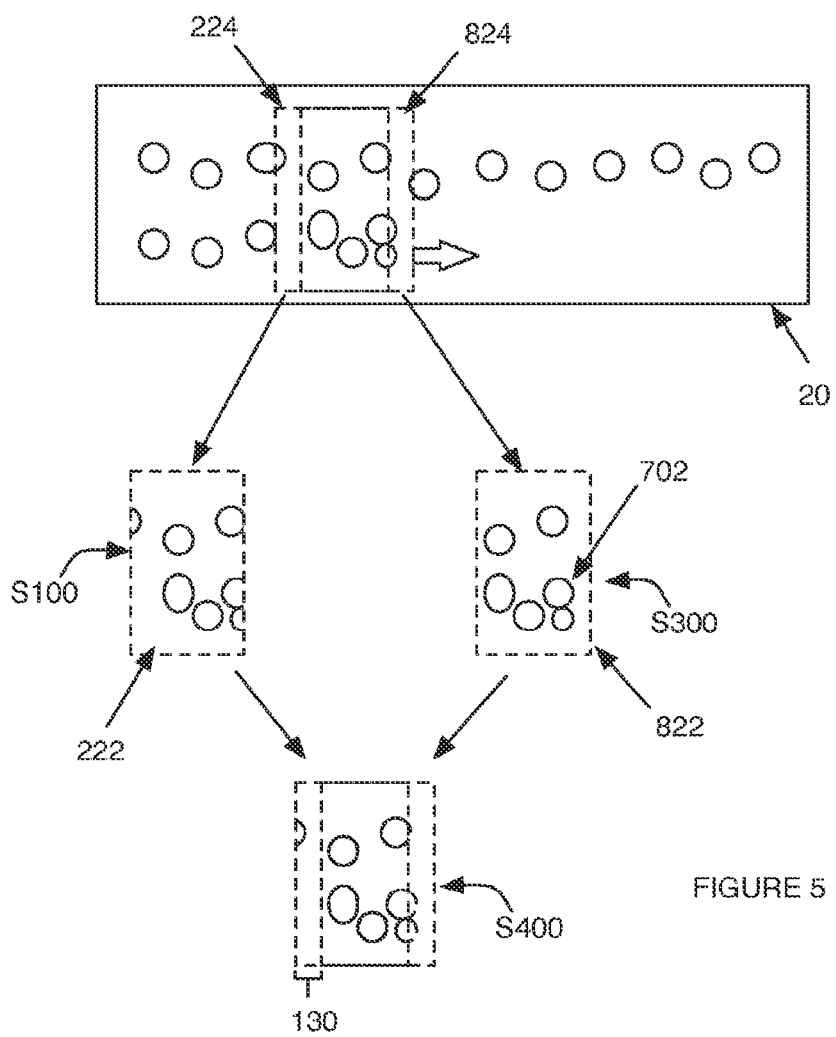
FIG. 5 is a schematic representation of determining pixel shift between the first and second images.

Recording a second measurement of a second field region S300 functions to record an image for use in odometry calibration. The measurement can additionally or alternatively be used for target identification, target prescription (e.g., treatment determination for the plant), treatment calibration, treatment validation, treatment monitoring, or for any other suitable use. The second measurement can be an image (e.g., single image, stereo image, omnidirectional image, multispectral image, etc.), a scan (e.g., a set of linear measurements), or any other suitable measurement. The second measurement is preferably recorded with the verification sensor (second sensor), but can alternatively be recorded with the detection sensor (first sensor) or any other suitable sensor. The second measurement preferably records parameters of (e.g., an image of) a second geographic region within the field (second region, second field region), but can alternatively be associated with any other suitable geographic location or region. The second region is preferably substantially the first region, such that it overlaps with the first region beyond a threshold percentage or proportion (e.g., 75% of the image), an example of which is shown in FIG. 5. However, the second region can overlap with the first region below a threshold percentage or proportion, be separate and distinct from the first region (e.g., be a region adjacent the first region, be a region separated from the first region by an intervening region, etc.), or be any other suitable region.

The second measurement is preferably associated with a timestamp (second time), wherein the timestamp can reflect the time (e.g., absolute or relative) at which the second measurement was recorded. The second time can be selected such that the field region within the verification sensor field of view substantially coincides with the first region, or can be any other suitable time. In one variation, the second measurement is taken in response to the second time or target travelled distance (e.g., camera separation distance, as estimated by the odometry mechanism) being met. In a second variation, the system can select the measurement corresponding to the second time from a set of measurements captured at a predetermined frequency as the system travels along the field. However, the second time can be otherwise selected and/or used.

Recording the second measurement S300 can additionally include correcting the second measurement for known distortions or errors. For example, when the measurement is an image, recording the first image can include correcting the image for lens distortion using image processing techniques.

Calibrating the odometry mechanism based on the first and second measurements S400 functions to reduce the distance measurement error from the odometry mechanism by using a secondary, slower, odometry mechanism. In some variations, calibrating the odometry mechanism includes correcting mechanical odometry mechanism measurements using a visual odometry mechanism (e.g., wherein the first and second measurement pair includes a first and second image). The odometry mechanism is preferably calibrated based on a plurality of measurement pairs (e.g., wherein each pair includes a first and second measurement), but can alternatively be calibrated based on a single measurement pair, based on a set of first images, based on a set of second images, or based on any other suitable set of measurements. Calibrating the odometry mechanism S400 can include determining odometry correction factors (e.g., a position correction factor and pixels per real-world inch, etc.) and correcting odometry mechanism measurements with the odometry correction factors.

Determining the odometry correction factors functions to determine the values to be used in correcting the odometry measurements. The odometry correction factors can accommodate for camera-to-ground height variations, which can result in plant size and/or interplant distance estimation inaccuracies. The odometry correction factors can additionally or alternatively accommodate for odometry measurement inaccuracies due to ground features, which can result in inaccurate plant location assignment and/or over- or under-treatment of plants. In one variation, the odometry correction factors can include a camera height from the ground or a parameter associated with camera height (e.g., number of pixels per real-world unit of length, such as number of pixels per real-world inch [PPI]), a position correction factor (e.g., a wheel radius correction factor [WR] that accommodates for wheel slip or slide, resulting in an adjusted effective radius), or any other suitable odometry correction factors.

In one example of the method, the odometry correction factors can be determined based on an estimated traversed distance between the first time and the third time, a pixel shift value between the first and second images, and a fixed distance between the first and second cameras.

The estimated traversed distance can be determined from the odometry mechanism. In one variation in which the system includes a wheel and rotary encoder odometry mechanism, the estimated traversed distance can be determined from the number of full or partial wheel rotations between the first and second time, as measured by the rotary encoder. However, the estimated traversed distance can be determined in any other suitable manner.

Determining the pixel shift value (PS) can include using feature extraction and correlation techniques to determine the amount of pixel shift 130 between the first and second images. In one example, determining the pixel shift value can include analyzing the first and second images to identify a set of common reference features 702 between the first and second images, and determining an amount of pixel shift between the first and second images, based on positions of the common reference features within the first and second images, respectively. The pixel shift value can be the number of pixels that the features within the first (or second) image should be shifted to substantially match (e.g., within a threshold amount) the same features within the second (or first) image. Alternatively or additionally, the pixel shift value can be a vector including a number of pixels and the direction that the features should be shifted. Alternatively or additionally, the pixel shift value can be a percentage of the image size, or be any other suitable measure of pixel shift. The extracted features can be unknown features, wherein some or all of the parameters of the feature (e.g., dimensions, size, shape, color, etc.) was not previously known. Examples of unknown features include environmental or field features (e.g., in-situ plants, rocks, ground divots, ground protrusions, etc.), treatment application indicators (e.g., spray marks), or any other suitable feature. Additionally or alternatively, the extracted features can be known features, wherein one or more feature parameters are known. In one example, the extracted feature can be a ruler of known dimension (e.g., width, distance between tick marks, etc.) that travels with the system a known distance from the camera or a known distance from the ground. In a second example, the extracted feature can be a spray mark of known dimension having contrasting or non-natural coloring (e.g., orange, pink, etc.). However, the extracted feature can be any other suitable pre-existing or manually introduced feature.

In one variation of the method, the odometry correction factors (e.g., PPI and WR) can be determined based on the following formula:

$$PS/PPI + N * WR = CC$$

wherein CC is the camera separation distance (e.g., between the first and second camera), N is the number of wheel rotations between the first and second images, PS is the amount of pixel shift between the first and second images, PPI is the number of pixels per real-world inch, and WR is the position correction factor and/or effective wheel radius correction factor. The equation is preferably solved based on multiple pixel shift value and wheel rotation pairs, wherein each pair is generated from a different image pair. However, the equation can be solved based on a single pixel shift value and wheel rotation pairs, based on a single image, or solved in any other suitable manner.

Determining the odometry calibration factors can additionally include removing outliers before determining the odometry calibration factors. Removing outliers can include applying a least-squares method (e.g., linear or non-linear least squares) to one or more pixel shift value and wheel rotation pairs, then removing outliers (e.g., pixel shift value and wheel rotation pairs deviating from the model beyond a predetermined deviation value) from the resultant data set. However, the outliers can be otherwise removed.

Alternatively or additionally, the odometry mechanism can be calibrated by constructing an optical flow field from the set of images collected by the detection camera, the set of images collected by the verification camera, and/or the set of images collected by both the detection camera and verification camera, checking the flow field vectors for potential errors and to remove outliers, estimating the camera motion from the optical flow (e.g., by using a Kalman filter, finding geometric and/or 3D feature properties and minimizing a cost function based on the re-projection error between adjacent images, etc.), and determining odometry correction factors such that the corrected odometry measurements substantially match the camera motion. However, the odometry mechanism can be otherwise calibrated using the visual odometry mechanism. Additionally or alternatively, the system motion can be determined based on a "direct" or appearance-based visual odometry technique which minimizes an error directly in sensor space, wherein the odometry correction factors can be determined to substantially match the corrected mechanical odometry measurements to the visual odometry-determined system motion. Additionally or alternatively, calibrating the odometry mechanism can be substantially empirical, wherein the system can iteratively select odometry correction factor values, apply the odometry correction factor values to the odometry mechanism measurements, determine the effect of the odometry correction factor values on the outcome (e.g., treatment location), and adjust the odometry correction factor values based on the outcome to better approximate a desired outcome. However, the odometry mechanism can be otherwise calibrated.

Figure 17:
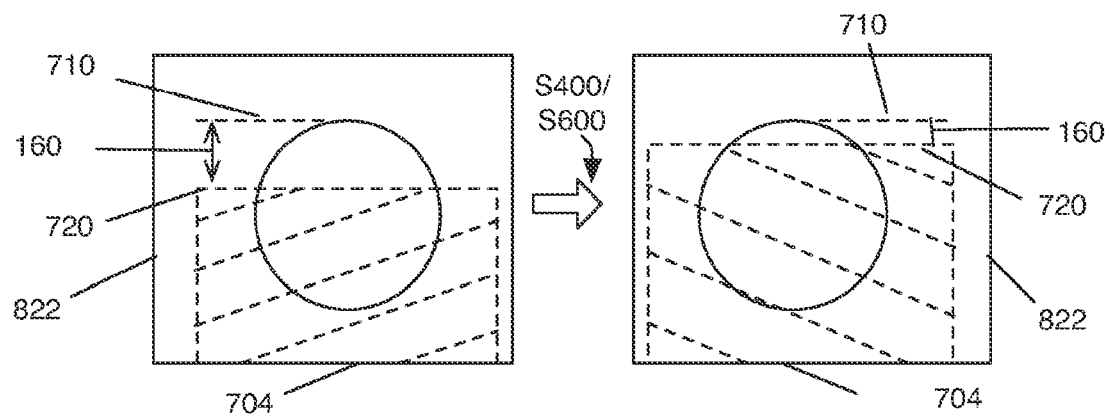

The method can additionally include repeating the odometry calibration process during system operation. The odometry calibration process can be repeated at a predetermined frequency (e.g., continuously during system operation), in response to the occurrence of a recalibration event, or at any other suitable frequency. An example of the effects of repeated odometry calibration is shown in FIG. 17. The recalibration event can be determination that an error between an estimated action position and an actual action position (determined from the images) exceeds a threshold error, or be any other suitable event. The odometry calibration process is preferably performed using a different set of measurements (e.g., a set of measurements more recently recorded), but can alternatively be performed using an overlapping set of measurements with the prior iteration, the same set of measurements as the prior iteration, or be based on any other suitable set of measurements.

i. Treatment.

Figure 3:
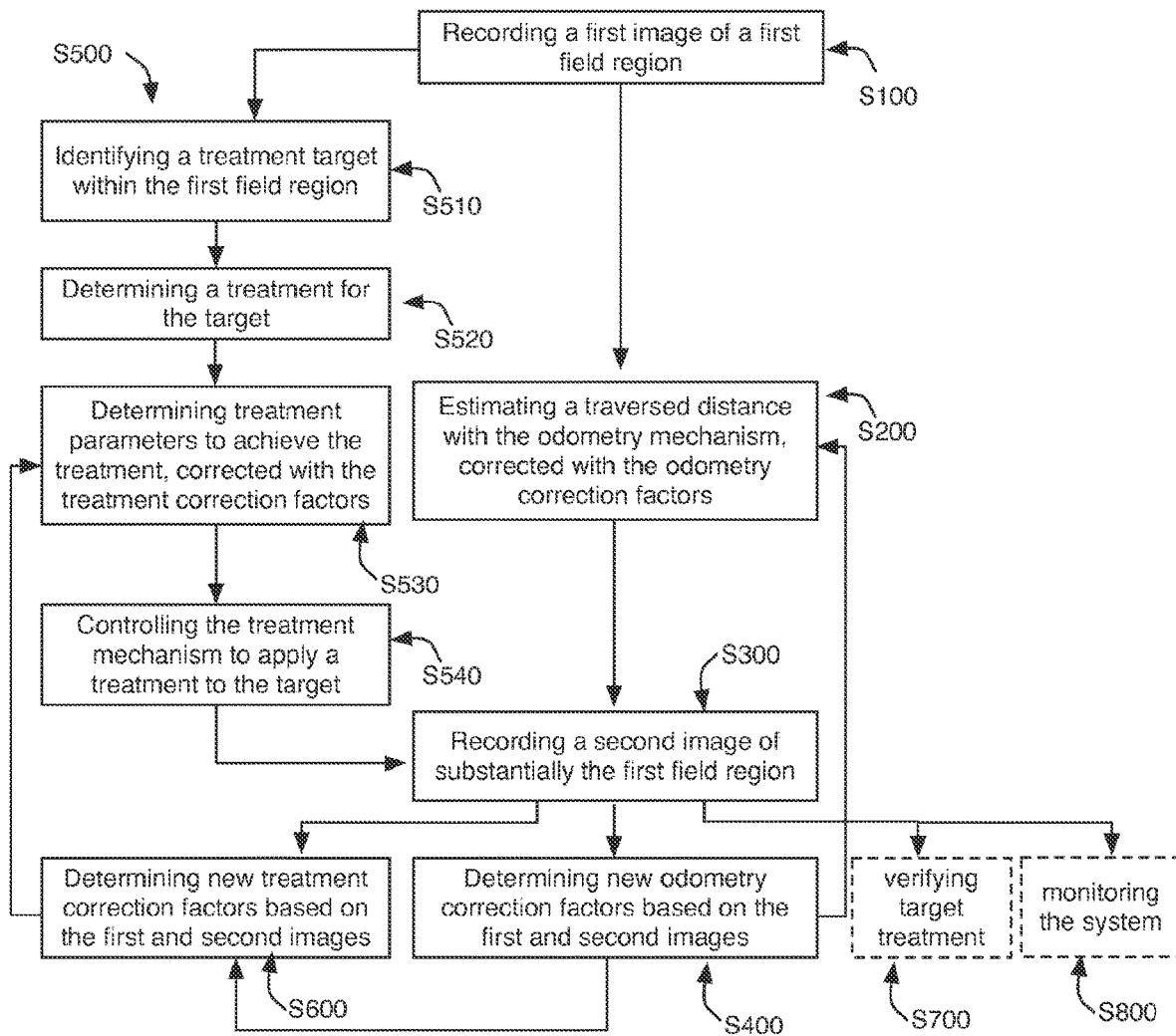
FIG. 3 is a schematic representation of the calibration method, including odometry calibration, treatment calibration.
Figure 4:
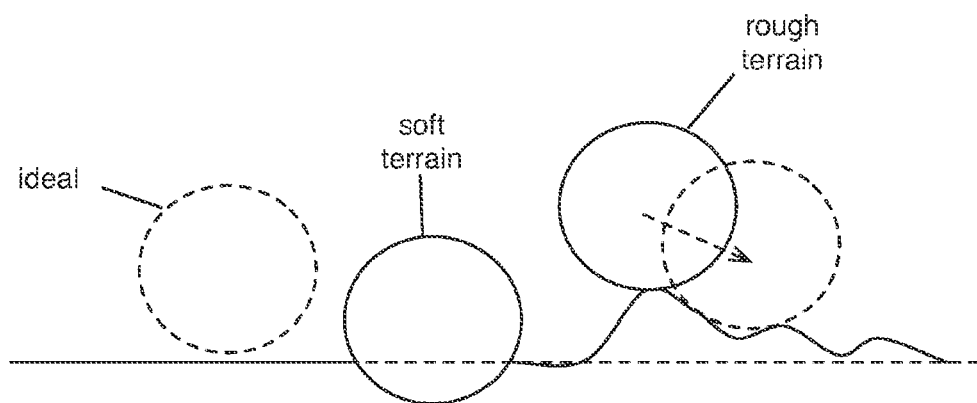
FIG. 4 is a schematic representation of environmental effects on an encoder wheel.
Figure 6:
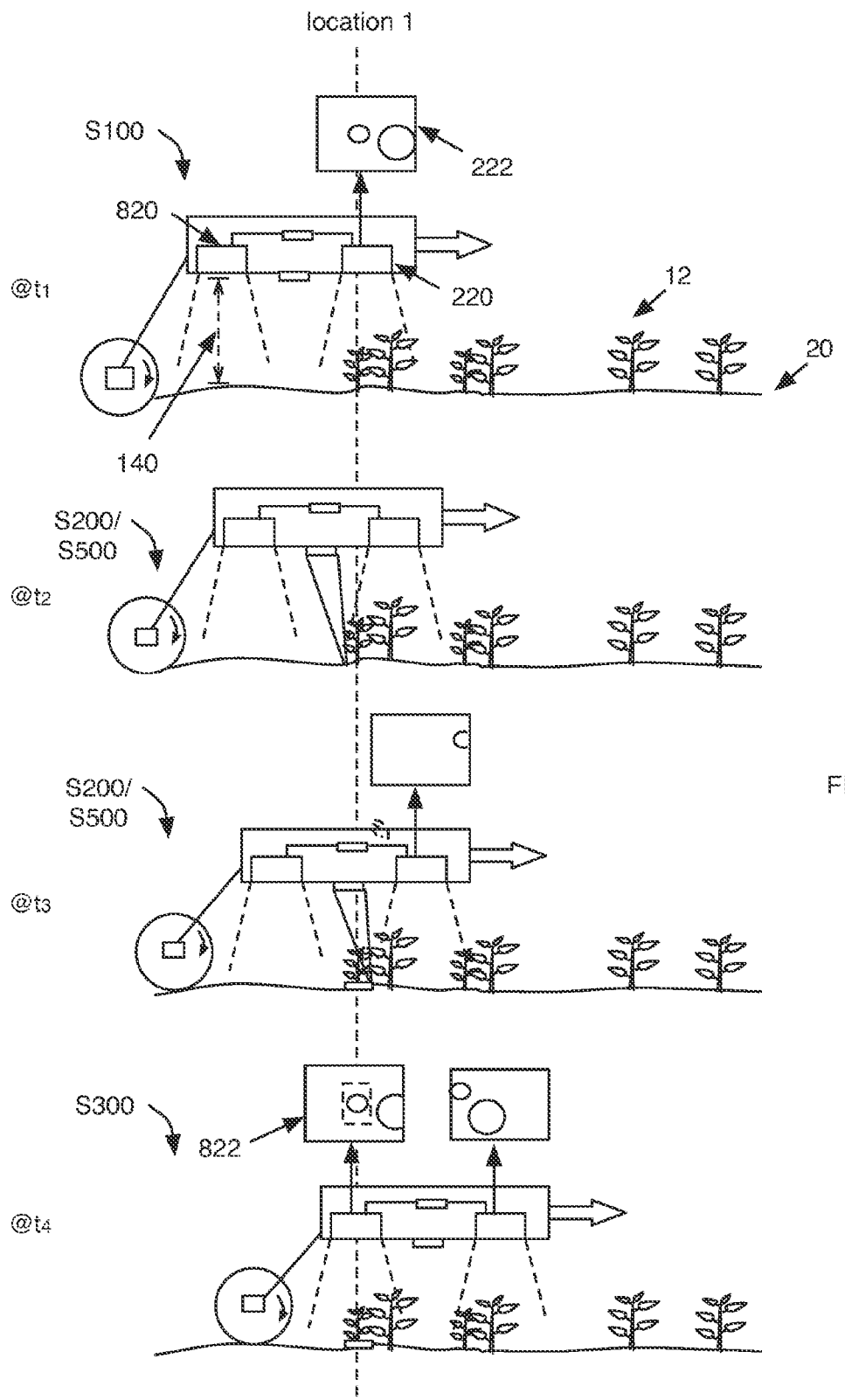
FIG. 6 is a schematic representation of an example of the precision agriculture system capturing the first image of a first region at a first time, initiating treatment for a target within the first region at a second time, ceasing the treatment (e.g., transitioning from a first mode to a second mode) at a third time, and recording the second image of substantially the first region at a fourth time.
Figure 8:
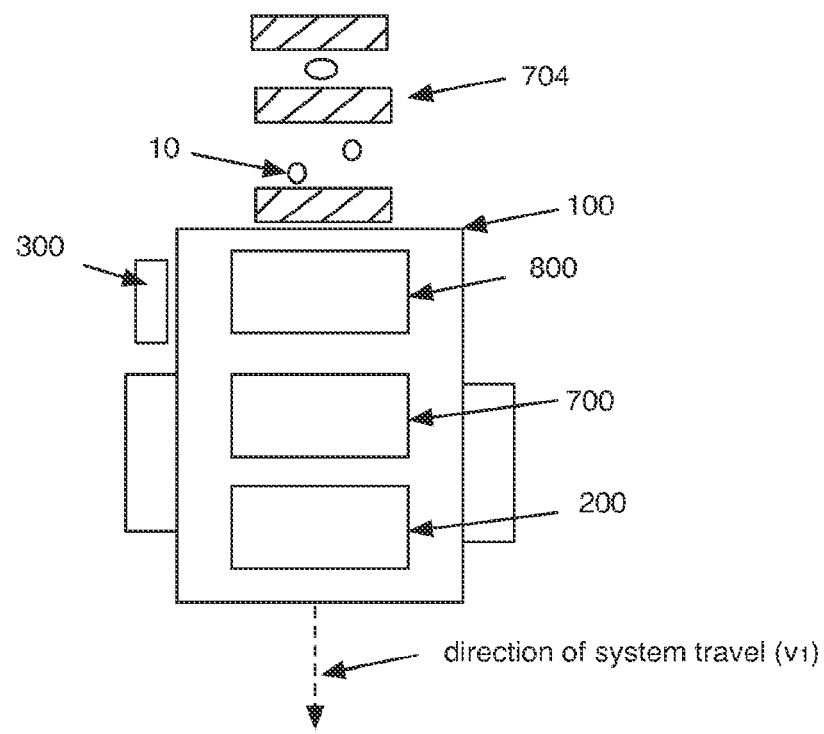
FIG. 8 is a schematic representation of an example of the agriculture system treating targets in-situ.

As shown in FIG. 3, the method can additionally include treating the plants in-situ S500. The plants can be treated as disclosed in Ser. No. 13/788,320 filed 7 Mar. 2013 and/or Ser. No. 14/444,897, filed 28 Jul. 2014, but can alternatively be treated in any other suitable manner. Example treatments can include inaction (e.g., not applying a treatment material to the plant), acting on the plant (e.g., applying a treatment material to the plant and/or surrounding region), acting on the environment surrounding the plant, or include any other suitable plant treatment. The plants are preferably treated between the first and second times, during a treatment time period, as the system traverses through the field (an example of which is shown in FIG. 8). The plants can be treated substantially concurrently with, within a threshold time duration of, before, or after: travelled distance estimation, odometry calibration, treatment calibration, and/or any other suitable process, an example of which is shown in FIG. 6.

Treating the plants in-situ S500 can include identifying a first plant within the first region S510, determining a treatment for the plant S520, determining treatment parameters to achieve the treatment S530, and controlling the treatment mechanism to apply a treatment to the target S540. Determining treatment parameters to achieve the treatment S530 can include determining a target treatment boundary location based on the first image and determining a transition time to transition the treatment applied to the field from a first treatment state to a second treatment state to achieve a transition location approximating the target treatment boundary. The treatment mechanism preferably applies a first treatment in the first operation mode, and applies a second treatment different from the first treatment in the second operation mode. The treatment mechanism can additionally or alternatively apply any suitable number of treatments in any suitable number of modes. The method can additionally include identifying a second plant proximal the first plant and determining a second treatment for the second plant before target treatment boundary determination, wherein the second treatment is different from the first plant. However, the plants can be treated in any other suitable manner.

Individual or plant clusters can be identified using feature detection techniques, in the manner disclosed in U.S. application Ser. No. 13/788,320, or be determined in any other suitable manner. Plant treatments can be determined as disclosed in U.S. application Ser. Nos. 13/788,320 and/or 14/444,897, or be determined in any other suitable manner. The plant treatment for the first plant preferably corresponds to the first treatment mode (first treatment state), but can alternatively correspond to any other suitable treatment mode.

Determining a target treatment boundary location based on the first image functions to identify a geographic location at which the applied treatment should be switched from the first treatment to the second treatment to achieve the determined treatments for the plants and/or field. The target treatment boundary location 710 is preferably arranged between a first and second plant or field region having different assigned treatments (e.g., target treatments, target outcomes), but can alternatively be arranged in any other suitable location. For example, if a first plant is to be killed and an adjacent, second plant is to be retained, then the target treatment boundary location can be located between the first and second plants. The target treatment boundary location 710 is preferably determined after determining a treatment for the first plant, and can additionally be determined after determining a treatment for the second plant. The target treatment boundary location 710 can be automatically determined (e.g., by maximizing a cost value function, solving an optimization equation, etc.), but can alternatively be manually or otherwise determined. Alternatively, the target treatment boundary location 710 can be determined independent of the target treatments for the plant and/or field, or be otherwise determined.

Determining a transition time functions to determine the time at which the treatment mechanism should be actuated to achieve the target treatment boundary. The transition time is preferably a global time, but can alternatively be a time duration from a reference time (e.g., from the first time) or be any other suitable time. The transition time preferably accommodates for inaccuracies in the odometry measurement, time of flight delays due to external factors (e.g., wind), internal factors (e.g., treatment mechanism failures, angle, distance from the target, treatment pressure, etc.), or any other suitable inaccuracies that can influence the location of the treatment boundary, but can alternatively not accommodate for such inaccuracies.

The transition time can be determined based on the estimated velocity of the system and the target distance 706 between an instantaneous treatment mechanism location and the target treatment boundary location. The estimated velocity of the system can be determined based on the rate of encoder ticks (e.g., the wheel rotation rate), the velocity of the drive mechanism, or be determined in any other suitable manner. The estimated velocity of the system can additionally or alternatively be corrected by the position correction factor (e.g., to accommodate ground features) The estimated distance between the instantaneous treatment mechanism location and the target treatment boundary location can be determined based on a known distance between the detection sensor mounting point and the treatment mechanism mounting point, or be determined in any other suitable manner. The estimated distance between the instantaneous treatment mechanism location and the target treatment boundary location can be corrected by a sensor- or camera-to-treatment mechanism correction factor to accommodate for changes in the treatment mechanism distance from the ground, angle, distance from the detection sensor, or for any other suitable changes (e.g., due to plants hitting the treatment mechanisms). The transition time can additionally or alternatively be determined based on a system height, as determined from the estimated or determined camera height from the ground, the pixels per real-world inch, and/or from any other suitable measurement or parameter. The transition time can additionally or alternatively be corrected by a timing delay, wherein the timing delay can be determined from treatment calibration based on a prior treatment. The prior treatment can be within the same field, be the treatment of an adjacent plant, be within the same operation run, or be any other suitable treatment. However, the transition time can be otherwise determined.

Controlling the treatment mechanism to apply a treatment to the target S540 can include transitioning the treatment mechanism from a first operation mode to a second operation mode and applying a treatment to the target with the treatment mechanism, or include any other suitable method.

Transitioning the treatment mechanism from a first operation mode to a second operation mode functions to apply the desired treatments to the field. The treatment mechanism is preferably transitioned at the transition time, but can alternatively be transitioned at the target treatment boundary location or be transitioned in response to the occurrence of any other suitable transition event. The treatment mechanism can be transitioned before, after, or during treatment application to the target. The treatment mechanism transition is preferably controlled by the processor, but can alternatively be otherwise controlled.

Applying a treatment to the target with the treatment mechanism functions to apply the determined treatment to the plant, field region, or other target. The treatment is preferably applied to previously identified plants concurrently with first plant identification, treatment determination, and/or treatment calibration, but can alternatively be applied before, after, or at any other suitable time. Treatments that can be applied to the target include those disclosed in U.S. application Ser. No. 14/444,897, but can additionally or alternatively include any other suitable treatments. Applying a treatment to the target preferably includes controlling the treatment mechanism to apply the treatment to the target in one of a plurality of modes. For example, the treatment mechanism can spray a treatment in the first operation mode, and not spray the treatment in the second operation mode. In another example, the treatment mechanism can additionally spray at a second pressure different from the pressure of the first operation mode in a third operation mode. The operation mode preferably corresponds to the selected treatment for the plant coinciding with the treatment region (e.g., field region receiving the treatment), but can alternatively be different. In systems including multiple treatment mechanisms, applying a treatment to the target can additionally include selecting one or more treatment mechanisms and controlling the selected treatment mechanisms to operate in the selected mode. The treatment mechanisms can be selected based on the treatment applied by the respective treatment mechanisms, the location of the treatment mechanisms (e.g., proximity to the target), or be selected in any other suitable manner.

The method can additionally include identifying a second plant proximal the first plant. The second plant can be identified from a second detection image (e.g., a second "first image") recorded by the detection sensor, or be identified in any other suitable manner. The second plant can be immediately adjacent the first plant along the travel path, distal (not immediately adjacent) the first plant along the travel path, adjacent the first plant along a vector at an angle to (e.g., perpendicular, etc.) the travel path, distal the first plant along a vector at an angle to (e.g., perpendicular, etc.) the travel path, or arranged in any other suitable location relative to the first plant.

The method can additionally include determining a second treatment for the second plant different from the first treatment. The second treatment preferably corresponds to the second treatment mode (second treatment state) different from the first treatment state, but can alternatively correspond to any other suitable treatment mode.

The treatment mechanism is preferably transitioned from the first operation mode to the second operation mode after determination of the second treatment for the second plant. For example, if the first plant is to be retained and a second plant adjacent the first plant along the travel axis is to be killed, the system can control the treatment mechanism to switch from the retention treatment mode (e.g., not spraying, spraying a first fertilizer concentration, spraying a growth promoter, etc.) to the removal treatment mode (e.g., spraying, spraying a second fertilizer concentration, spraying a growth inhibitor, etc.) at the transition time. In contrast, if both the first and second plants are to be retained, the system can continuously operate in the retention treatment mode as it travels by both plants. Alternatively, the treatment mechanism can be operated in the retention treatment mode only when the treatment mechanism is estimated to be within a threshold distance of the first plant (e.g., within a threshold distance of the first plant before and after the treatment mechanism passes the plant). However, the treatment mechanism can alternatively be transitioned in response to the occurrence of any other suitable event.

As shown in FIG. 3, the method can additionally include calibrating the treatment mechanism S600. Calibrating the treatment mechanism can function to accommodate for delays between treatment initiation (e.g., controlling the treatment mechanism to operate in the desired treatment mode) and actual treatment application to the target. Calibrating the treatment mechanism can additionally or alternatively function to accommodate for changes to the system, such as changes in the system or treatment mechanism distance from the ground, treatment mechanism angle relative to a gravity vector or the frame, or any other changes to the system that may occur during operation. The treatment mechanism is preferably calibrated based on the verification image, and can additionally or alternatively be calibrated based on the detection image. The verification image can be the second image used for odometry calibration or a different image. The verification image can be captured by the detection sensor, verification sensor, or any other suitable sensor.

Calibrating the treatment mechanism can include identifying treatment identifiers within the verification image and determining treatment calibration factors based on the parameters of the treatment identifiers.

Figure 12:
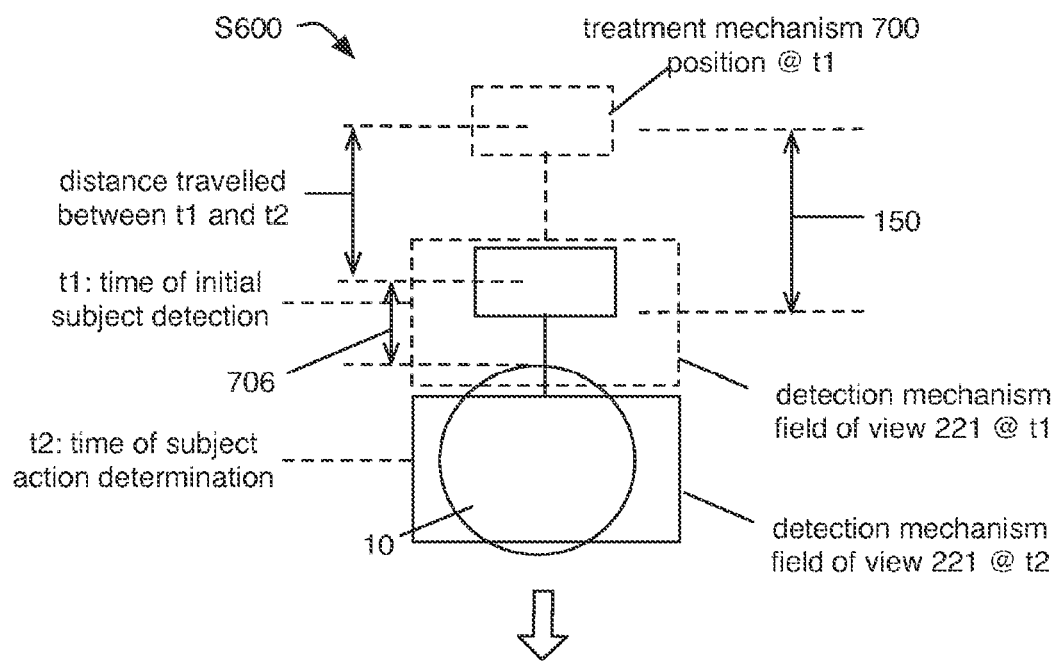
FIG. 12 is a schematic representation of a variation of determining that the estimated distance has met the predetermined distance.

Identifying treatment identifiers within the verification image functions to identify features within the image that are indicative of treatment application, an example of which is shown in FIG. 12. This can additionally function to verify whether the treatment occurred S700, and/or whether the treatment was applied to the target. The treatment indicators can be learned (e.g., based on a trained set) or otherwise determined. The treatment identifiers can be identified using feature detection techniques, or be determined in any other suitable manner. Examples of treatment indicators include color patterns (e.g., a dark band indicating sprayed treatment terminating in a substantially flat boundary, next to a light background indicative of dry soil), heat patterns, moisture patterns, feature gradient patterns, gradient vectors, foam, or any other suitable feature indicative of applied treatment.

Determining the treatment calibration factors function to determine factors to be used in adjusting the target treatment boundary location, the transition time, and/or any other suitable treatment mechanism operation parameter. The treatment calibration factors can include a timing delay and a sensor-to-treatment mechanism distance (e.g., camera to treatment mechanism distance), but can additionally or alternatively include any other suitable factor. The treatment calibration factors are preferably determined based on the set of odometry calibration factors, such as the camera height from the ground (or, alternatively, the PPI) and the position correction factor (determined above), but can alternatively be determined based on any other suitable set of factors.

Figure 13:
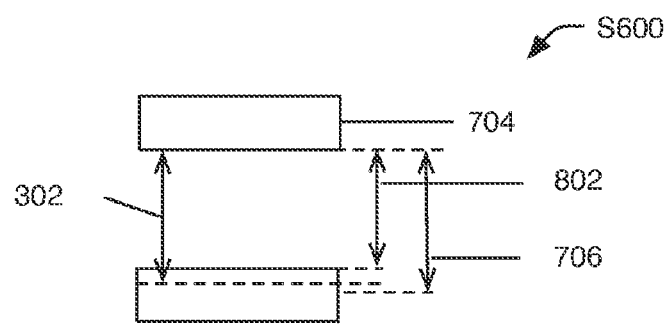
FIGS. 13 and 14 are a schematic representation of a first and second example of the effect differences between the distance estimated by the mechanical odometry mechanism, the actual distance determined from the visual odometry mechanism, and the target distance have on the treatment application.
Figure 14:
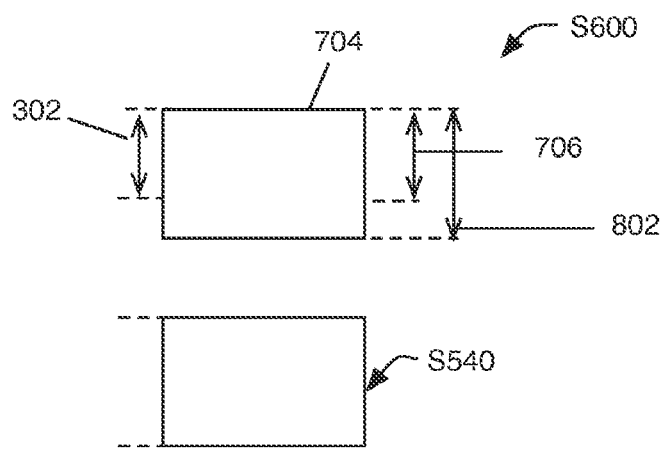

In one variation of the method, the treatment calibration factors are determined using the following formula:

$$e/PPI = CS - dN * WR * DT$$

wherein e is the error between the expected or target treatment or treatment boundary location 710 and the actual treatment or treatment boundary location 720 and/or the error between the estimated distance travelled based on the odometry measurement 302 and the actual distance travelled 802 as determined based on the image pair (examples shown in FIGS. 12, 13, and 14); PPI is the pixels per real-world inch; CS is the camera-to-treatment mechanism correction factor; dN is the system velocity (estimated or determined); WR is the position correction factor; and DT is the timing delay. The pixels per real-world inch and position correction factor can be dynamically determined during odometry calibration, predetermined (e.g., manually entered), or be otherwise determined. The system velocity can be the wheel radial velocity as estimated by the encoder (e.g., rate of encoder ticks), the system velocity as determined based on a position sensor (e.g., an accelerometer), the drive mechanism velocity, or be any other suitable approximation or determination of the system travel velocity within the field.

The error between the expected treatment or treatment boundary location and the actual treatment or treatment boundary location can be in units of pixels, real-world measurement (e.g., inches), or in any other suitable unit. In one variation, the error can be determined by identifying the target treatment boundary location in the first image, determining the position of the target treatment boundary location relative to an identified reference feature within the first image, identifying the treatment indicator indicative of the target treatment boundary location in the second image (e.g., verification image), identifying the corresponding reference feature in the second image, determining the position of the actual treatment boundary relative to the reference feature within the second image, and determining the difference in position (error) between the position of the target treatment boundary location relative to the reference feature and the actual treatment boundary relative to the reference feature. In a second variation, the error can be determined by identifying corresponding reference features within the first and second images, shifting the images such that the corresponding reference features substantially coincide, and comparing the target boundary location determined from the first image to the actual boundary location identified within the second image. However, the error can be otherwise determined.

The camera-to-treatment mechanism correction factor and timing delay can be determined by solving the equation. The camera-to-treatment mechanism correction factor and timing delay can be determined based on one or more error-system velocity pairs. The first and second images can be collected at a single system velocity value (e.g., such that the correction factors are applicable to treatment adjustment at the velocity value), at multiple system velocity values (e.g., such that the correction factors are applicable to treatment adjustment at multiple velocity values), or be determined based on any other suitable set of measurements collected in association any other suitable set of parameter values. Alternatively, the camera-to-treatment mechanism correction factor and/or timing delay can be determined in any other suitable manner.

The method can additionally include repeating the treatment calibration process during system operation. The treatment calibration process can be repeated at a predetermined frequency (e.g., continuously during system operation), in response to the occurrence of a recalibration event, or at any other suitable frequency. An example of the effects of repeated treatment calibration is shown in FIG. 17. The recalibration event can be determination that an error between an estimated action position and an actual action position (determined from the images) exceeds a threshold error, or be any other suitable event. The treatment calibration process is preferably performed using a different set of measurements (e.g., a set of measurements more recently recorded), but can alternatively be performed using an overlapping set of measurements with the prior iteration, the same set of measurements as the prior iteration, or be based on any other suitable set of measurements.

ii. Monitoring.

As shown in FIG. 3, the method can additionally include monitoring the system S800, which can function to identify system failures, treatment mechanism failures, or failure of any other suitable system component or functionality. The system can send a notification to the drive mechanism (e.g., to a user interface within the cab of the tractor), send a notification to a remote system (e.g., remote monitoring system), store an error message on-board the system, or perform any other suitable action in response to identification of a failure. Examples of failures include solenoid sticking (e.g., failure on or failure off), overtreatment (e.g., treatment of adjacent regions or plants), undertreatment (e.g., treatment of only a portion of the region or plant to be treated), dripping, incorrect treatment mechanism operation, or any other suitable failure.

The system is preferably monitored (e.g., self-monitored, manually monitored, or remotely monitored) based on a monitoring image. The monitoring image can be the second image used for odometry calibration, the verification image, or any other suitable image. The monitoring image can be recorded by the detection sensor, verification sensor, or any other suitable sensor. However, the system can be monitored in any other suitable manner.

Figure 7:
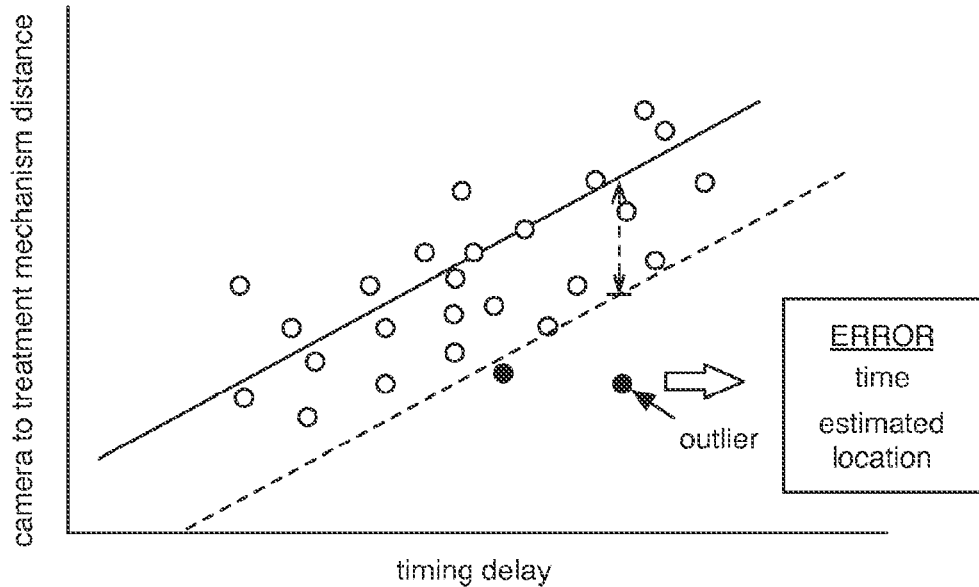
FIG. 7 is a schematic representation of an example of identifying system failures based on the treatment correction factors.

In a first variation, monitoring the treatment mechanism can include: comparing a first set of treatment correction factors to a plurality of treatment correction factor sets, and determining a treatment mechanism failure in response to the first set of treatment correction factors deviating from the plurality beyond a threshold deviation. For example, a least-squares method (e.g., linear or non-linear least squares) can be applied to the plurality of treatment correction factors sets, wherein deviants from the best fit equation can be identified as outliers (an example of which is shown in FIG. 7). These outliers can be identified as treatment mechanism errors, and can additionally or alternatively be removed from the plurality of treatment correction factor sets used to determine the treatment correction factors for use in treatment calibration. An error for the timestamp and/or geographic location associated with the first or second image of the first image pair can additionally be generated if the first set of treatment correction factors qualify as an outlier. The treatment correction factors can be determined during treatment calibration or be determined in any other suitable manner. The treatment correction factors can include a camera-to-treatment mechanism distance correction factor value and a timing delay value, and can additionally or alternatively include any other suitable correction factor. The first set of treatment correction factors is preferably extracted from a first image pair, while the plurality of treatment correction factor sets can be extracted from a plurality of image pairs recorded before and/or after to the first image pair.

In a second variation, a failure can be detected in response to identification of a difference between the target treatment boundary location and the actual treatment boundary location (e.g., the error determined during treatment calibration) exceeding a threshold difference. The threshold difference can be ½ an inch, ¼ of an inch, or be any other suitable distance. However, a failure can be identified in response to determination that the treatment mechanism is continuously treating (e.g., failed on, as determined from the verification or monitoring image), has failed to treat (e.g., failed off, as determined from the verification or monitoring image), is dripping or otherwise applying treatment between active treatment operation (e.g., as determined from the verification or monitoring image), has entirely or partially treated a second plant with treatment intended for a first plant, has failed to treat all or a portion of the region or plant to be treated, in response to determination that more than a threshold number of plants have been mistreated (e.g., have had the wrong treatment applied to them), in response to determination that an incorrect treatment mechanism was operated (e.g., based on the location of the treatment indicators within the verification or monitoring image), or in response to detection of any other suitable failure condition. The failure conditions identified from the images can be learned (e.g., using machine learning techniques), manually identified, or otherwise identified.

Additionally or alternatively, the image pairs and/or correction factors can be used to dynamically, iteratively, or otherwise build a binary model, build a learning plant model (e.g., record plant parameter values), used as a binarization check, used to learn environmental parameters (e.g., learn or otherwise determine lighting and/or image characteristics for later analyses), used to characterize the ambient environment (e.g., used to determine dry soil, wet soil, etc.), or used in any other suitable manner. The binary model can include a recommendation system and/or automatic plant selection system, wherein different plant combinations can be analyzed against the binary module during the calibration.

An alternative embodiment preferably implements the above methods in a computer-readable medium storing computer-readable instructions. The instructions are preferably executed by computer-executable components preferably integrated with a precision agricultural treatment mechanism. The precision agricultural treatment mechanism can include a mechanical odometry mechanism, a visual odometry mechanism, and an odometry calibration system configured to use the slower visual odometry mechanism outputs to calibrate the faster mechanical odometry mechanism outputs. The precision agricultural treatment mechanism can additionally include a treatment mechanism and a treatment calibration system configured to leverage the visual odometry mechanism inputs (e.g., images) and physical system outputs to identify targets (e.g., plants or field regions) for treatment, correct for treatment mechanism inaccuracies, and substantially precisely treat the targets (e.g., based on the images and odometry calibration). The treatment calibration system outputs and/or visual odometry mechanism inputs (e.g., images) can additionally be used to verify target treatment, monitor the precision agricultural treatment mechanism for failures, and/or be used in any other suitable manner. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

The invention claimed is:

1. A method for identifying a failure of a treatment mechanism of a plurality of treatment mechanisms of a farming machine:
    capturing, using a monitoring sensor of the farming machine, an image of the plurality of treatment mechanisms of the farming machine while the farming machine is traversing a field performing plant treatments for plants in the field;
    detecting, based on the image, the failure of the treatment mechanism of the farming machine; and
    in response to detecting the failure, automatically performing, using the farming machine, a treatment mechanism remediation action based on the detected failure of the treatment mechanism.

2. The method of claim 1, wherein detecting the failure of the treatment mechanism comprises:
    accessing a normal treatment factor for the plurality of treatment mechanisms, the normal treatment factor describing operation of the plurality of treatment mechanisms without failures;
    determining, based on the image, a current treatment factor for the treatment mechanism, the current treatment factor describing operation of the treatment mechanism; and
    in response to determining that the current treatment factor is above a threshold deviation different than the normal treatment factor.

3. The method of claim 1, wherein detecting the failure of the treatment mechanism comprises:
    accessing a treatment prescription for a plant in the field; and
    determining, using the image, that a performed treatment for the plant is different than the treatment prescription for the plant.

4. The method of claim 1, further comprising:
    capturing, using an additional sensor of the farming machine, an additional image of the plurality of treatment mechanisms while the farming machine is traversing the field performing plant treatments, and
    wherein detecting the failure of the treatment mechanism is based on the image and the additional image.

5. The method of claim 1, wherein detecting the failure of the treatment mechanism comprises determining that the treatment mechanism is continuously treating the plants in the field.

6. The method of claim 1, wherein detecting the failure of the treatment mechanism comprises determining that the treatment mechanism is failing to treat the plants in the field.

7. The method of claim 1, wherein detecting the failure of the treatment mechanism comprises determining that the treatment mechanism is applying treatment to an incorrect plant.

8. The method of claim 1, wherein performing the treatment mechanism remediation action comprises sending a notification to a remote system indicating the failure.

9. The method of claim 1, wherein performing the treatment mechanism remediation action comprises sending a notification to an operator of the farming machine indicating the failure.

10. The method of claim 1, wherein the failure comprises one of: a solenoid of the treatment mechanism failing, an overtreatment of a plant, an undertreatment of the plant, a leak of the treatment mechanism, or an incorrect operation of the treatment mechanism.

11. A farming machine comprising:
    a plurality of treatment mechanisms configured to treat plants in a field as the farming machine traverses through the field;
    a monitoring sensor configured to capture images of the plurality of treatment mechanisms as the farming machine traverses through the field and performs plant treatments for plants in the field;
    one or more processors; and
    a non-transitory computer-readable storage medium comprising computer program instructions for identifying a failure of a treatment mechanism of the plurality of treatment mechanisms of the farming machine, the computer program instructions, when executed by the one or more processors, causing the one or more processors to:
  capture, using the monitoring sensor, an image of the plurality of treatment mechanisms of the farming machine while the farming machine is traversing the field performing plant treatments for plants in the field;
  detect, based on the image, the failure of the treatment mechanism of the farming machine; and
  in response to detecting the failure, automatically perform, using the farming machine, a treatment mechanism remediation action based on the detected failure of the treatment mechanism.

12. The farming machine of claim 11, wherein executing the computer program instructions for detecting the failure of the treatment mechanism further causes the one or more processors to:
  capture, using a monitoring sensor of the farming machine, an image of the plurality of treatment mechanisms while the farming machine is traversing a field performing plant treatments for plants in the field;
  detect, based on the image, a failure of the treatment mechanism; and
  in response to detecting the failure, automatically performing an action with the farming machine based on the detected failure of the treatment mechanism.

13. The farming machine of claim 11, wherein executing the computer program instructions for detecting the failure of the treatment mechanism further causes the one or more processors to:
  access a normal treatment factor for the plurality of treatment mechanisms, the normal treatment factor describing operation of the plurality of treatment mechanisms without failures;
  determine, based on the image, a current treatment factor for the treatment mechanism, the current treatment factor describing operation of the treatment mechanism; and
  in response to determining that the current treatment factor is above a threshold deviation different than the normal treatment factor.

14. The farming machine of claim 11, wherein executing the computer program instructions for detecting the failure of the treatment mechanism further causes the one or more processors to:
  access a treatment prescription for a plant in the field; and
  determine, using the image, that a performed treatment for the plant is different than the treatment prescription for the plant.

15. The farming machine of claim 11, further comprising, an additional image sensor configured for capturing additional images of the plurality of treatment mechanisms while the farming machine is traversing the field and performing plant treatments; and
  wherein executing the computer program instructions further causes the one or more processors to:
    capture, using the additional image sensor, an additional image of the plurality of treatment mechanisms while the farming machine is traversing the field performing plant treatments, and
    wherein detecting the failure of the treatment mechanism is based on the image and the additional image.

16. The farming machine of claim 11, wherein executing the computer program instructions for detecting the failure of the treatment mechanism further causes the one or more processors to:
  determine that the treatment mechanism is continuously treating the plants in the field.

17. The farming machine of claim 11, wherein executing the computer program instructions for detecting the failure of the treatment mechanism further causes the one or more processors to:
  determine that the treatment mechanism is failing to treat the plants in the field.

18. The farming machine of claim 11, wherein executing the computer program instructions for detecting the failure of the treatment mechanism further causes the one or more processors to:
  determine that the treatment mechanism is applying treatment to an incorrect plant.

19. The farming machine of claim 11, wherein performing the treatment mechanism remediation action further causes the one or more processors to:
  send a first notification to a remote system indicating the failure, or
  send a second notification to an operator of the farming machine indicating the failure.

20. A non-transitory computer-readable storage medium comprising computer program instructions for identifying a failure of a treatment mechanism of a plurality of treatment mechanisms of a farming machine, the computer program instructions, when executed by one or more processors, causing the one or more processors to:
  capture, using a monitoring sensor of the farming machine, an image of the plurality of treatment mechanisms of the farming machine while the farming machine is traversing a field performing plant treatments for plants in the field;
  detect, based on the image, the failure of the treatment mechanism of the farming machine; and
  in response to detecting the failure, automatically perform, using the farming machine, a treatment mechanism remediation action based on the detected failure of the treatment mechanism.

* * * * *